R. S. WELLBORN.
AUTOMATIC TRAIN PIPE CONNECTOR.
APPLICATION FILED AUG. 9, 1913. RENEWED SEPT. 18, 1915.
1,186,152.
Patented June 6, 1916.
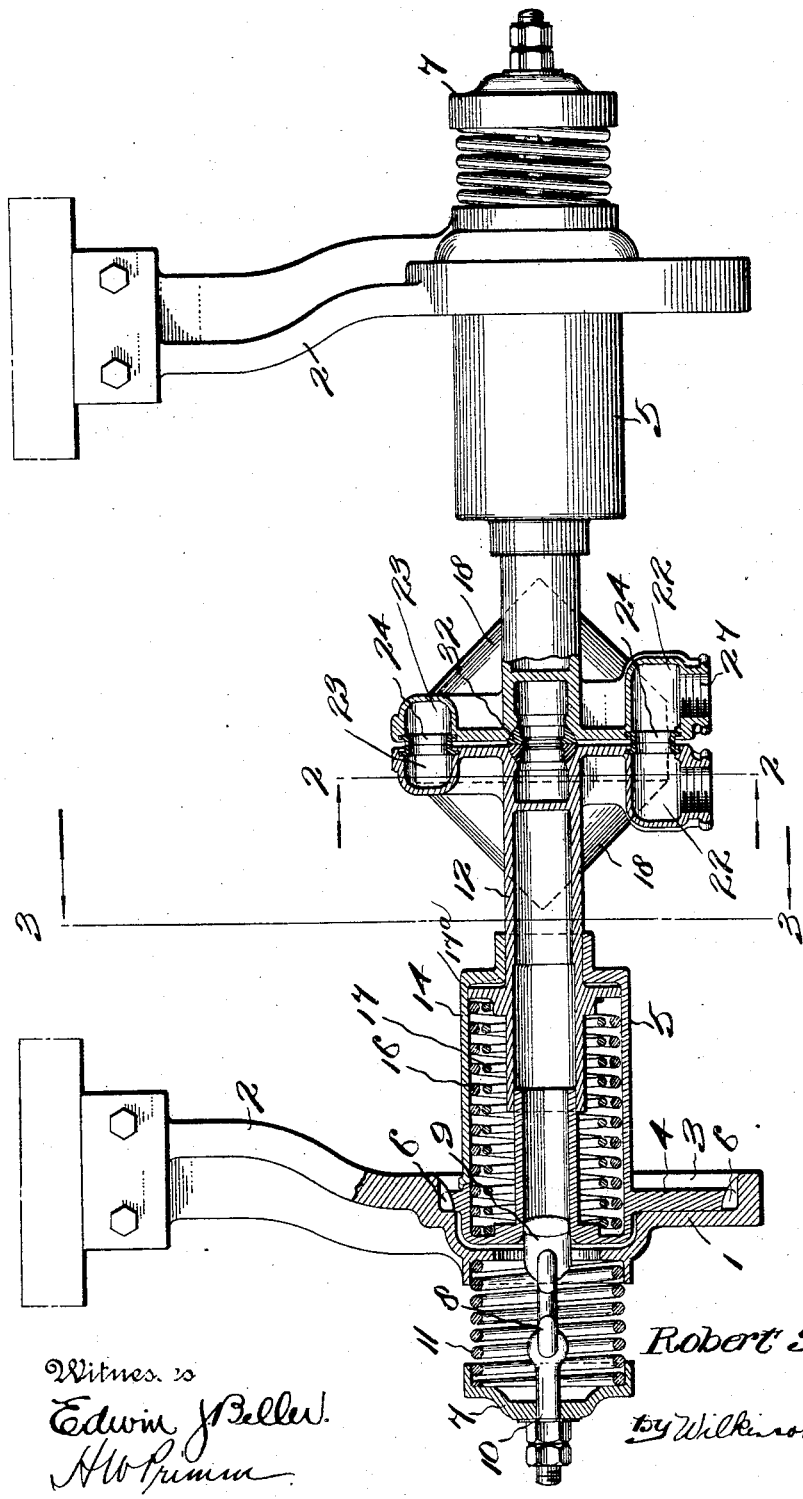

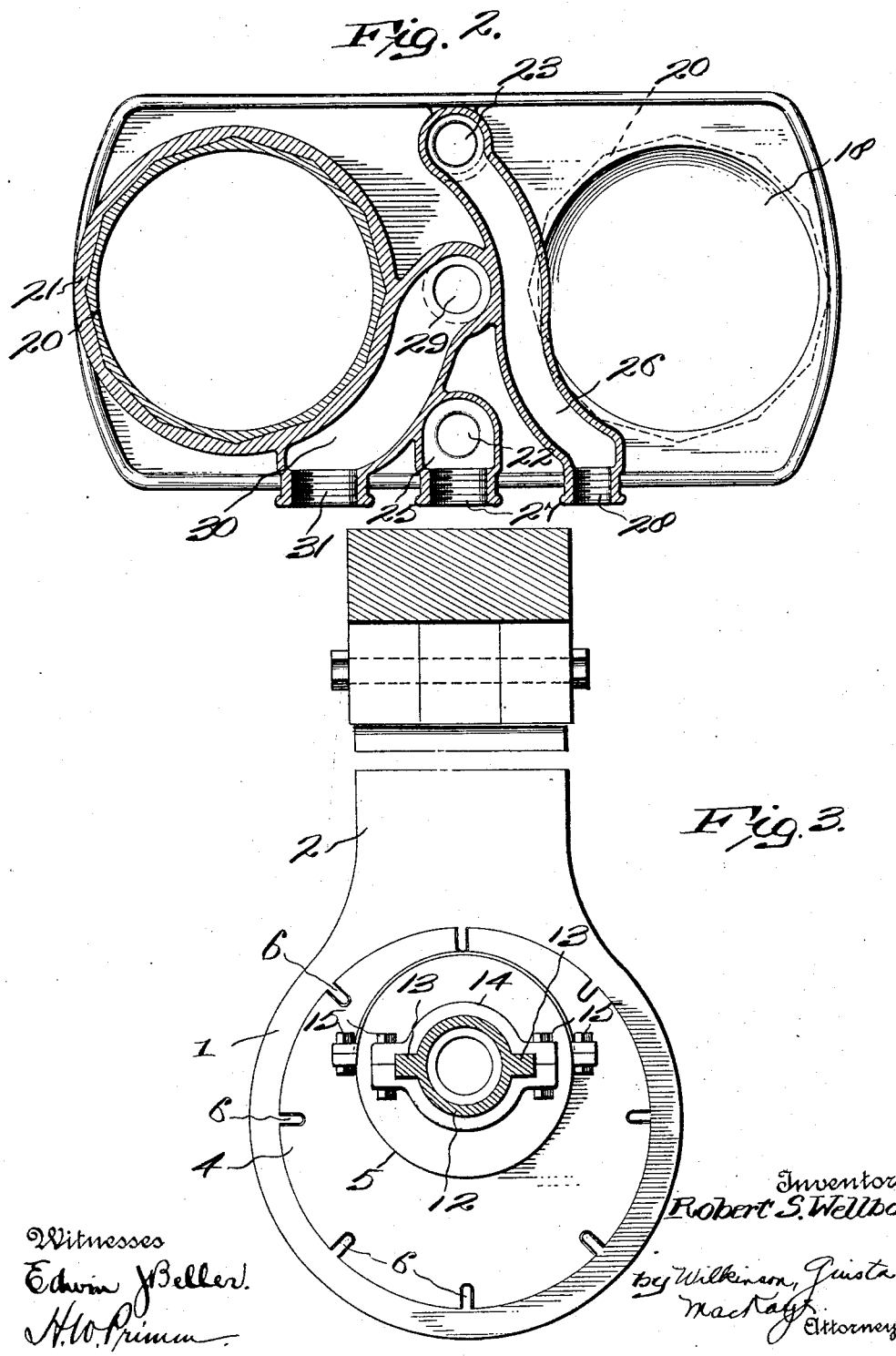

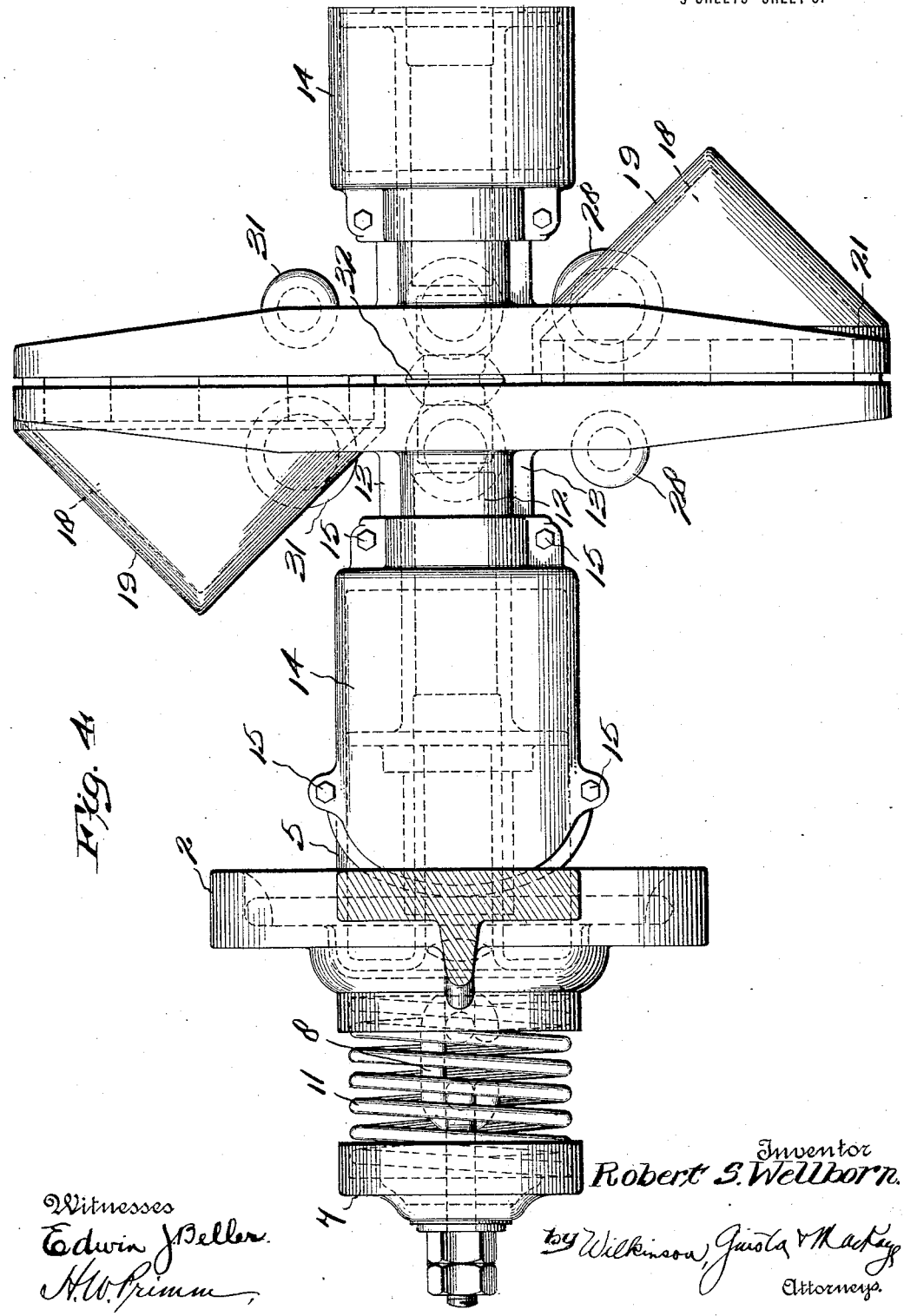

UNITED STATES PATENT OFFICE.

ROBERT S. WELLBORN, OF DECATUR, GEORGIA, ASSIGNOR TO HOWARD BUCKNELL, OF ATLANTA, GEORGIA.

AUTOMATIC TRAIN-PIPE CONNECTOR.

1,186,152.

Specification of Letters Patent.

Patented June 6, 1916.

Application filed August 9, 1913, Serial No. 783,998. Renewed September 18, 1915. Serial No. 51,409.

*To all whom it may concern:*

Be it known that I, ROBERT S. WELLBORN, a citizen of the United States, residing at Decatur, in the county of Dekalb and State of Georgia, have invented certain new and useful Improvements in Automatic Train-Pipe Connectors; and I do hereby declare the following to be a full, clear, and exact description of the invention, such as will enable others skilled in the art to which it appertains to make and use the same.

My invention relates to improvements in automatic train-pipe connectors, and it consists in the constructions, combinations and arrangements herein described and claimed.

An object of my invention is to provide an improved train-pipe connector adapted for effective operation under all practical conditions.

A further object of my invention is to provide a strong and durable train-pipe connector constructed to firmly couple and efficiently prevent bleeding or leakage of air under all service conditions of long continued use.

In the accompanying drawings forming a part of this application, and in which similar reference symbols indicate corresponding parts in the several views: Figure 1 is a side elevation of a pair of coupled train-pipe connectors, parts being shown in central vertical section. Fig. 2 is an enlarged section on the line 2—2 of Fig. 1. Fig. 3 is an enlarged section on the line 3—3 of Fig. 1. Fig. 4 is a plan view of one of my improved connectors, showing a portion of a similar connector in coupled engagement therewith.

Referring to the drawings, 1 indicates a bracket connected to, or formed integral with, any suitable draw bar 2, and provided with a recessed seat 3 for rockingly supporting the disk-shaped base 4 of a tubular casing 5; said seat being provided with projections 6 for engaging recesses in said base 4 to prevent axial rotation of the latter. The base 4 is flexibly connected to a head 7, as by a link 8 engaging eye bolts 9 and 10 in said base and head, respectively, and a spiral spring 11 is confined between said head 7 and bracket 1 for yieldingly maintaining said base on its seat.

A supporting member 12 is slidably mounted in the casing 5 and carries a connector head at its outer end; said supporting member being provided with flanges 13 slidably engaging guides on said casing 5 and a casing cap 14 secured to the latter by bolts 15. A pair of concentric springs 16 and 17 are confined between the rear end of the casing 5 and a circumferential flange 17ª on the supporting member 12 for yieldingly maintaining the latter extended to support the connector head in coupling position.

The connector heads are of the butt face type, and are provided with coöperating gathering cones 18 and conical sockets 19 extending, respectively, forwardly and rearwardly from their engaging faces symmetrically to medial vertical lines of the latter; said gathering cones and sockets merging in the prismatic base portions 20 and 21, which inter-engage to rigidly lock the connector heads together in coupled engagement.

Each connector head is formed with ports 22 and 23 provided with projecting gaskets 24 of rubber, or other flexible material; said ports communicating with passages 25 and 26 leading from threaded nipples 27 and 28 for connection by flexible hose lengths to the air brake and signal train-pipes. A steam port 29 communicates with a passage 30 leading to a threaded nipple 31 for connection by a flexible hose length to the steam train-pipe; said steam port being provided with a gasket 32 of brass or other suitable material, which projects from the face of the head for engaging the corresponding gasket of a head coupled therewith. The gaskets 32 are preferably mounted on spherical seats to permit sufficient universal movement for insuring a tight packing engagement between said steam gaskets of a pair of coupled connector heads.

From the above description, it will be understood that my invention provides an improved automatic train-pipe connector, by which the connector heads will be guided into coupling engagement and rigidly hold in coupled position under all service conditions.

I have illustrated and described preferred and satisfactory constructions, but changes could be made within the spirit and scope of my invention.

I claim:

1. In an automatic train-pipe connector, the combination of a bracket, a casing mounted for universal movement on said bracket, resilient means for yieldingly maintaining said casing in normal position, a supporting member slidably mounted in said casing, a connector head carried by said member, and a plurality of springs engaging said member for yieldingly maintaining said connector head in coupling position, said resilient means consisting of a plate, an expansion spring mounted between the plate and bracket and engaging said plate and bracket and means connecting said plate with the casing extending through said bracket.

2. In an automatic train-pipe connector, the combination of a bracket, a tubular casing rockingly mounted on said bracket, resilient means for yieldingly maintaining said casing in normal position, a supporting member slidably mounted in said casing, a connector head carried by said member, and a plurality of concentric coiled springs within said tubular casing for yieldingly maintaining said connector head in coupling position, said resilient means consisting of an expansive spring having one end engaged with said bracket on the side of the bracket opposite to that upon which is mounted the casing and means connecting the other end of said spring with said casing extending through said bracket.

In testimony whereof, I affix my signature, in presence of two witnesses.

ROBERT S. WELLBORN.

Witnesses:
R. M. Parker,
H. H. Byrne.

Copies of this patent may be obtained for five cents each, by addressing the "Commissioner of Patents, Washington, D. C."